Jan. 17, 1928. 1,656,663
C. W. CARTER ET AL
APPARATUS FOR FRYING BACON
Filed Jan. 29, 1927 2 Sheets-Sheet 2
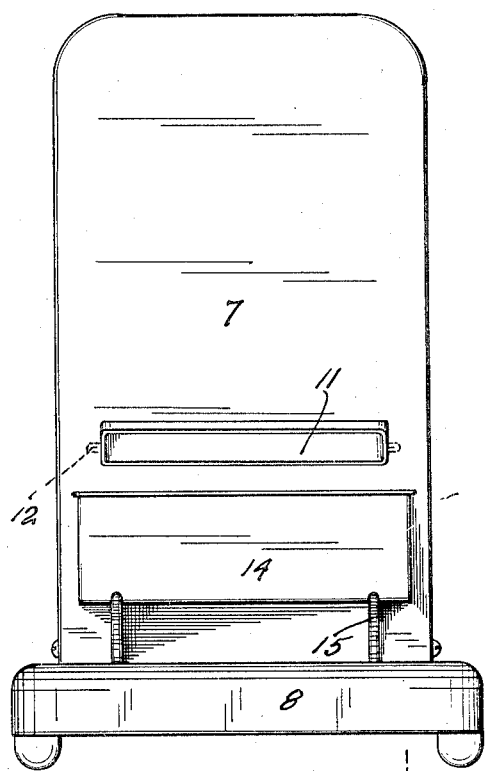
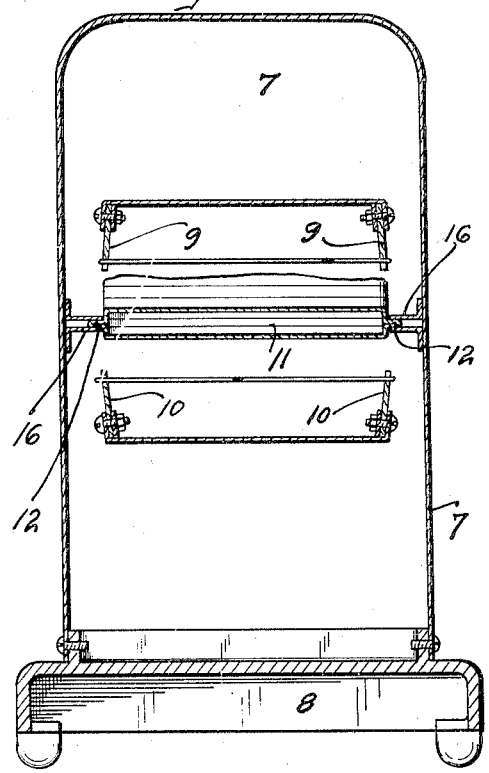
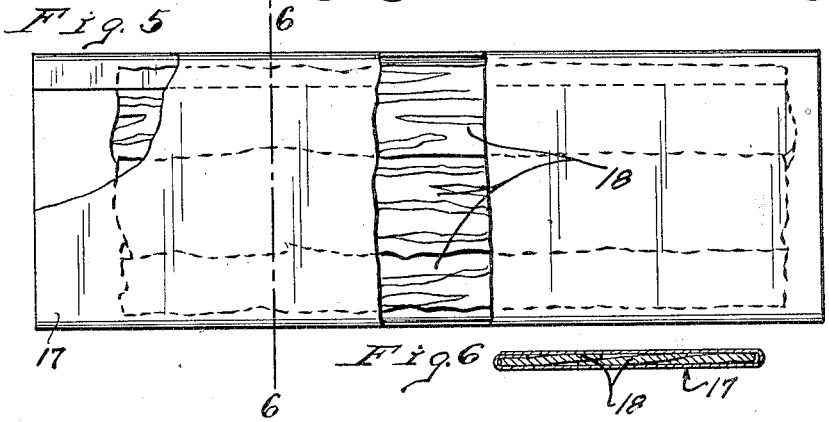
Inventors
Clarence W. Carter
Charles P. Strite
By their Attorneys Patented Jan. 17, 1928.

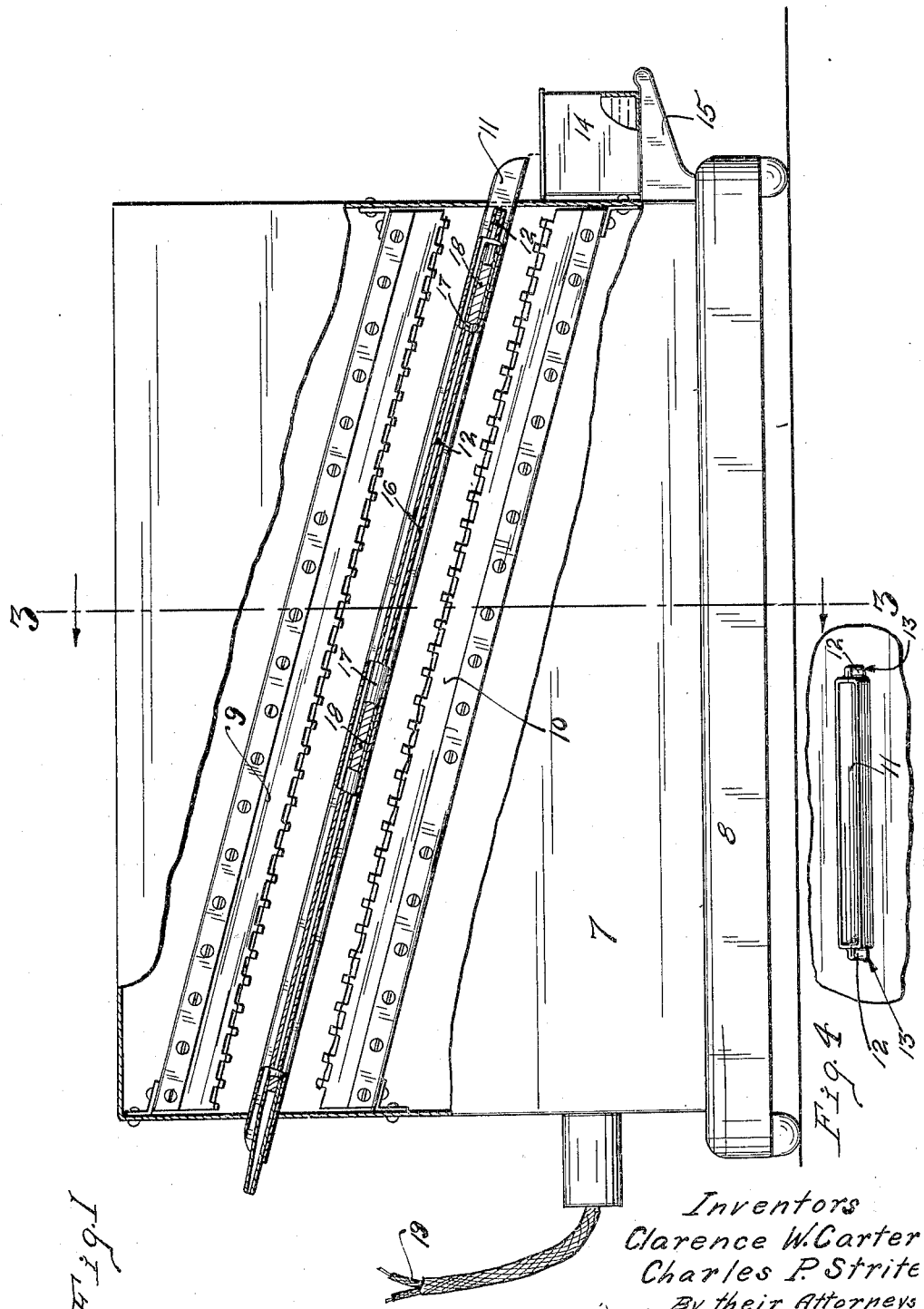

1,656,663

UNITED STATES PATENT OFFICE.

CLARENCE W. CARTER AND CHARLES P. STRITE, OF MINNEAPOLIS, MINNESOTA; SAID STRITE ASSIGNOR TO SAID CARTER.

APPARATUS FOR FRYING BACON.

Application filed January 29, 1927. Serial No. 164,640.

Our present invention relates to an improved apparatus for frying bacon or other thinly sliced meat, and generally stated, the invention consists of the novel steps of manipulation, devices, and combinations of devices hereinafter described and defined in the claims.

In the ordinary process of frying bacon, wherein the thinly cut strips of bacon are laid loosely on the bottom of a pan, it is practically impossible to prevent the bacon from curling up, even when great care is taken to repeatedly turn the same. Curled bacon shrinks and warps out of shape in such a way that it is not attractive in appearance and does not lie well in sandwiches or the like and, moreover, when the bacon is cooked in its own grease, the cooked product will be grease-soaked and not as palatable as when fried under conditions that leave the same in drier condition.

We have found that, by placing strips of bacon in a flat containing envelope, such as afforded by quite stiff wax paper, the bacon can be subjected to frying heat and will be held in perfectly flat condition while it is being fried. We have also found that in the use of such containing envelopes, having opens ends or at least having an open lower end, and by suspending or supporting the bacon-containing envelope at an angle to a horizontal while it is being subjected to the frying or cooking heat, the grease from the bacon will freely flow out of the open lower end of the envelope and will leave the fried or cooked bacon in substantially flat condition and comparatively free from grease. Bacon thus cooked has been found to have the very best flavor and to be much more palatable than bacon cooked in its own grease.

A major object of the invention is the provision of an extremely simple and efficient device or apparatus, such as may be sold at comparatively small price to meet the demands of domestic purposes, and whereby the above-indicated process of cooking or frying bacon or the like may be carried out.

Such an apparatus is illustrated in the accompanying drawings, wherein like characters indicate like parts throughout the several views.

Referring to the drawings:

Fig. 1 is a side elevation with some parts broken away and some parts sectioned, showing the apparatus;

Fig. 2 is a front end elevation of the apparatus;

Fig. 3 is a transverse vertical section taken on the line 3—3 of Fig. 1;

Fig. 4 is a fragmentary view in front elevation, illustrating the manner in which a tubular frying trough is inserted through the rear wall of the casing;

Fig. 5 is a plan view with some parts broken away, showing the paper envelope and strips of bacon contained therein; and Fig. 6 is a section taken on the line 6—6 of Fig. 5.

In the apparatus illustrated, the numeral 7 indicates a rectangular or box-like sheet metal casing secured on a base 8. Within the casing is a pair of vertically spaced obliquely set electrical heating elements, which may be of any suitable or approved construction and which are indicated as entireties by the numerals 9 and 10.

The numeral 11 indicates a frying trough in the form of a flat sheet metal tube provided at its edges with outstanding longitudinal flanges 12. This tubular trough 11 is inserted in an oblique position midway between the heating elements 9 and 10 and is extended through the rear and front plates of the casing. The rear plate of the casing is provided with notches 13 that freely pass the flanges 12 therethrough, but the front plate of said casing is not provided with such notches and the front ends of the flanges 12, in the structure illustrated come against the front plate of said casing and limit the downward and forward movement of the frying trough substantially to the position shown in Fig. 1, and in which position, both ends thereof project. The projecting front and lower end of the trough 11 is in a position to discharge the grease into a catch pan 14 shown as detachably mounted on brackets 15 secured to the casing.

Secured to the inner surfaces of the side walls of the casing 7 are vertically spaced oblique guide flanges 16, between which the flanges 12 of the trough 11 are extended and by which the trough is guided and held in its inclined position shown in Fig. 1. The waxed paper envelope 17 is preferably made from a flat sheet bent into the form of a flat container having overlapping longitudinal edges and open at both ends. This envelope encases and holds in flat condition a plurality of strips of bacon 18, (see particularly Figs. 5 and 6). Preferably also, the envelope is longer than the bacon strips.

In Fig. 1, the numeral 19 indicates current-supplying leads that extend from a suitable source and will be connected to the heating elements 9 and 10 in any suitable manner, not necessary for the purpose of this case to consider.

Operation: In the construction illustrated, the tubular trough 11 is readily removable, but except for cleaning the same, its removal will seldom be necessary. The envelope 17 with the bacon strips contained therein may be readily slipped into the tubular trough 11 and the bacon will be properly positioned when the upper end of the envelope is left slightly projecting from the upper end of the trough.

While the bacon is being fried, the grease will continuously run therefrom and into the catch pan 14. When the the bacon has been properly fried or cooked, the envelope containing the same may be readily removed.

In practice, it has been found that the heat required to properly fry or cook the bacon will not cause the paper envelope to disintegrate, and, hence that the envelope with its cooked contents may be readily removed as an entirety and, when opened up, will expose the properly cooked bacon in substantially flat condition.

It is proposed to have the bacon packed in the paper-containing envelopes at the packing plant and sold to the trade with each envelope containing a plurality of thinly cut bacon strips in condition for frying in the envelope as above described. In fact, it has been found that packers welcome such scheme, largely for the reasons stated by them that they take great care to produce a high grade bacon and that much of its fine qualities are lost under the hitherto common practice of frying the same.

Of course, the process and apparatus can be used for frying or cooking thinly cut meats or food other than bacon. Salt pork, cut in thin slices, may be fried to dry, crisp condition and will be found much more palatable than when fried in its own grease. Moreover, the frying of the bacon or the like in the envelope, which holds the same in flat condition, makes it possible to use bacon cut into very thin slices.

Of course, bacon or the like put up and sold in these paper envelopes is also kept in sanitary condition.

What we claim is:

1. An apparatus for frying strips of bacon and the like, comprising a flat tubular receptacle open at its lower end for the discharge of grease and adapted to contain the bacon strips, means for supporting said receptacle in an inclined position, and means for applying heat to the flat exterior surfaces of said tubular receptacle.

2. Means for frying meat, comprising an open-ended envelope containing the meat held thereby, an inclined receptacle open at its lower end for the discharge of grease and adapted to hold said envelope and the meat therein contained with the said envelope in an inclined position for the discharge of grease therefrom during the cooking action, and means for applying heat to the exterior of said receptacle.

3. An apparatus for frying strips of bacon and the like, comprising a casing, an open-ended receptacle extending obliquely through said casing, and means within said casing for applying heat to the exterior of said receptacle.

4. An apparatus for frying strips of bacon and the like, comprising a casing, an inclined open-ended receptacle having substantially flat upper and lower walls extending through said casing, and means within said casing for applying heat to the exterior of said receptacle.

5. The structure defined in claim 3 in which said receptacle is removable endwise from said casing.

6. The structure defined in claim 3 in which the lower end of said receptacle projects from said casing, and in further combination with a grease receptacle positioned to receive the grease from said receptacle.

In testimony whereof we affix our signatures.

CLARENCE W. CARTER.
CHARLES P. STRITE.